(12) United States Patent
Honsel et al.

(10) Patent No.: US 9,317,967 B1
(45) Date of Patent: Apr. 19, 2016

(54) DEFORMATION OF SURFACE OBJECTS

(71) Applicant: Pixar, Emeryville, CA (US)

(72) Inventors: Michael Honsel, San Francisco, CA (US); Jeremie Talbot, San Francisco, CA (US)

(73) Assignee: Pixar, Emeryville, CA (US)

( * ) Notice: Subject to any disclaimer, the term of this patent is extended or adjusted under 35 U.S.C. 154(b) by 251 days.

(21) Appl. No.: 14/031,369

(22) Filed: Sep. 19, 2013

(51) Int. Cl.
*G06T 17/00* (2006.01)
*G06T 19/00* (2011.01)
*G06T 13/00* (2011.01)

(52) U.S. Cl.
CPC ..................................... *G06T 17/00* (2013.01)

(58) Field of Classification Search
CPC combination set(s) only.
See application file for complete search history.

(56) References Cited

U.S. PATENT DOCUMENTS

| | | | |
|---|---|---|---|
| 7,184,047 B1 * | 2/2007 | Crampton | 345/473 |
| 2007/0035541 A1 * | 2/2007 | Isner et al. | 345/420 |

* cited by examiner

*Primary Examiner* — James A Thompson
(74) *Attorney, Agent, or Firm* — Kilpatrick Townsend & Stockton LLP

(57) ABSTRACT

Systems and methods for deformation of surface objects are disclosed. A method may include receiving an initial pose of a model comprising an underlying object and a plurality of surface objects, and a deformation of the model to a second pose. A measurement of the surface objects in the second pose can be used to determine inversely distorted surface objects, such that the lengths of the edges in the inversely distorted surface object are adjusted to counteract the distortion. Thus, when the inversely distorted surface objects are deformed to the second pose, they may appear less distorted than when the original surface objects are deformed to the second pose. Furthermore, a user may direct the level of inverse distortion, so that the surface objects, when inversely distorted and deformed to the second pose, may appear entirely rigid, entirely flexible, or some combination thereof.

20 Claims, 12 Drawing Sheets

US 9,317,967 B1

DEFORMATION OF SURFACE OBJECTS

The present invention relates generally to computer animation and graphics, and more particularly to techniques for determining positions of one or more surface objects in a distorted pose of a model.

BACKGROUND

With the wide-spread availability of computers, computer graphics artists and animators can rely upon computers to assist in production process for creating animations and computer-generated imagery (CGI). This may include using computers to have physical entities be represented by virtual models in computer memory. Typically, two-dimensional (2D) or three-dimensional (3D) computer-aided animation combines 2D/3D models and programmed movement of one or more of the models. Models may be constructed, for example, out of geometrical vertices, faces, and edges in a 3D coordinate system.

Some models may comprise a plurality of surface objects attached to an underlying object. Examples of surface objects attached to an underlying object may include scales on a fish, segments on an insect, or plates of armor on a knight. These virtual models can then be manipulated using computers to, for example, simulate physics, design aesthetic actions such as poses or other deformations, create lighting, coloring and paint, or the like, of characters or other elements of a computer animation display.

One of the challenges in manipulating models can be the balancing of a desire for visual realism of a character or other model with an art direction or theme to be conveyed, the latter of which may motivate cartoonish or otherwise unrealistic distortion of objects. For example, when a model comprising an underlying object and surface objects is deformed or otherwise placed into a new pose, it may be desirable for the surface objects to deform in a more realistic manner, e.g., when the surface objects represent rigid or semi-rigid objects.

Therefore, it is desirable to provide a method and system for the deformation of surface objects on a model, and potentially to further be directed by a user to be neither entirely rigid (i.e., realistic), nor entirely flexible (i.e., unrealistic).

BRIEF SUMMARY

One embodiment of the invention relates to methods for deformation of surface objects on an underlying object. The method may include receiving an initial pose of a model (e.g., a character, an item, etc.) comprising an underlying object and a plurality of surface objects, and a deformation of the model to a second pose. A measurement of the surface objects in the second pose can be used to determine inversely distorted surface objects, such that the lengths of the edges in the inversely distorted surface objects are adjusted to counteract the distortion. Thus, when the inversely distorted surface objects are deformed to the second pose, they may appear less distorted than when the original surface objects are deformed to the second pose. Furthermore, a user may direct the level of inverse distortion, so that the surface objects, when inversely distorted and deformed to the second pose, may appear entirely rigid, entirely flexible, or some combination thereof.

Other embodiments disclose systems comprising processors and memory configured to implement methods of deformation of surface objects. Other embodiments disclose a computer product comprising a non-transitory computer-readable medium storing code that causes one or more processors of a computer to implement methods of deformation of surface objects.

DEFINITIONS

Figure 1:
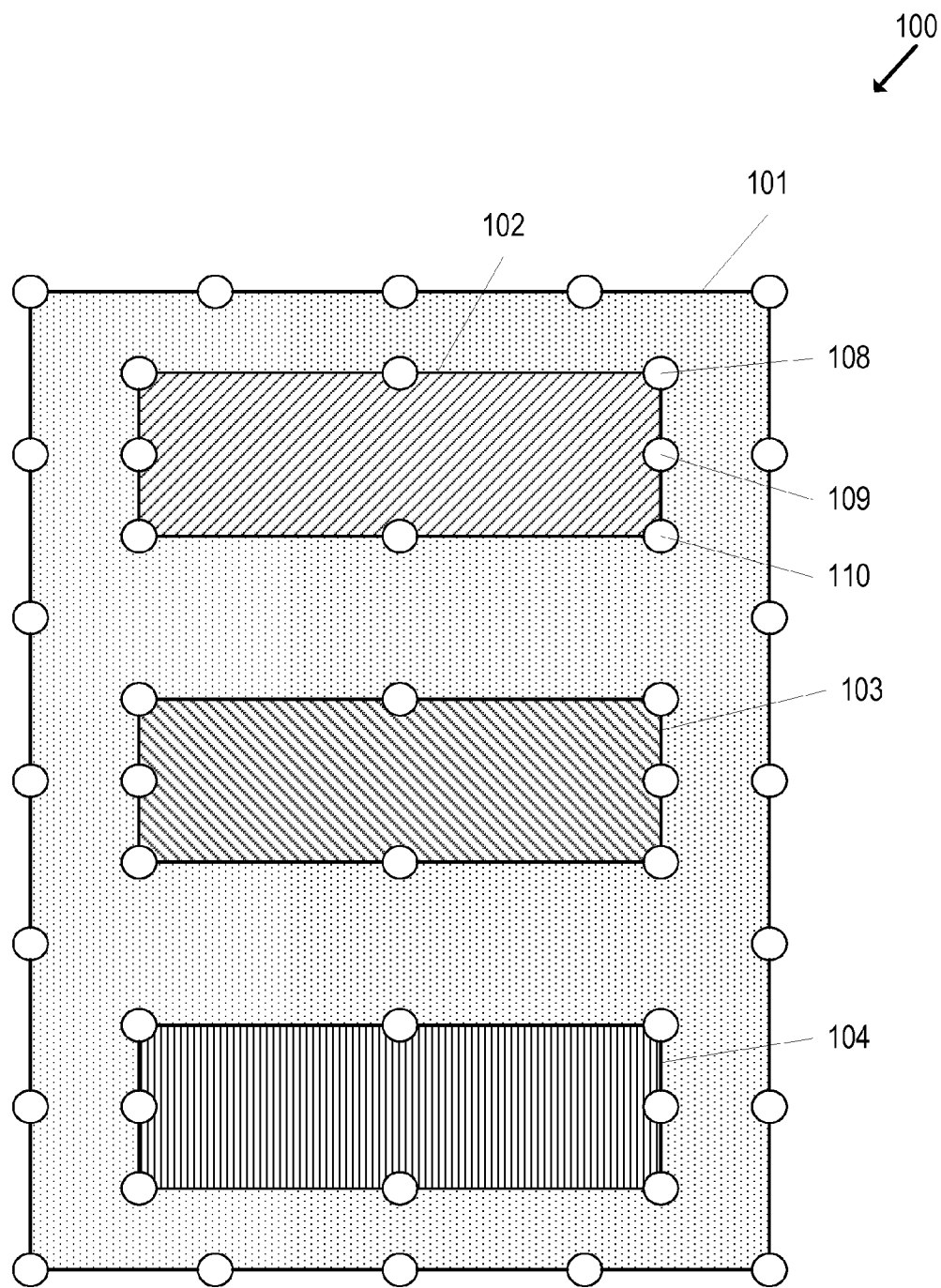
FIG. 1 shows an example model in a first pose comprising an underlying object and a plurality of surface objects.

A "model" may include any suitable computer representation of a character, an object, a landscape, or other virtual entity. Models may be constructed, for example, out of geometrical vertices, faces, and edges in a 2D or 3D coordinate system. Some models may comprise multiple virtual objects. For example, a model may comprise an underlying object and a plurality of surface objects attached to the underlying object.

An "underlying object" may include any object that may be rigged, posed, controlled, or deformed in any suitable manner. For example, the body of a character may be an underlying object. In some cases, the underlying object may represent a flexible surface, such as a skin or membrane, to which surface objects may be attached.

A "surface object" may include any object that is attached to the exterior of an underlying object. Examples of surface objects may include plates (e.g., plates of armor), scales, spikes, or segments. In some cases, surface objects may have a different perceived rigidity than an associated underlying object. This may motivate different behavior under deformation.

A "mesh" may include a polygon mesh, a collection of vertices and edges, or any other suitable representation of the shape of an object or objects. For example, an edge of a mesh may correspond to an edge in the object. An underlying object mesh may comprise vertices and edges for an underlying object. A surface object mesh may comprise vertices and edges for one or more surface objects.

A high-resolution or detailed mesh used to render or display an object may be referred to as a "fine mesh". Typically, the "fine mesh" may be used to render or display in full detail. In contrast, a "coarse mesh" may include a less detailed or low-resolution representation of an object. For example, a coarse mesh may include a subset of the vertices, edges, or faces in the fine mesh.

A "pose" may include any geometrical placement of a model, such as a character. For example, a pose may manifest as a deformation (such as a stretching, compression, bending), translation, or any other suitable transformation of the model. Reference may be made to an "undistorted pose", which may indicate an initial, neutral, or original position of a model. The undistorted pose may comprise undistorted objects, meshes, and edges. In some cases, a new pose may be defined by an animator using rigging, kinematics, controls, or other parameters associated with the model. The pose may cause distortion of the underlying object mesh and/or surface object meshes associated with the model.

A "distortion" may include any change in the relative positions of vertices and/or the lengths of edges in a mesh resulting from a deformation or new pose of an object or mesh. An underlying object that has been distorted may be referred to as a "distorted underlying object". Similarly, a surface object that has been distorted may be referred to as a "distorted surface object". A mesh that has been distorted may be referred to as a "distorted mesh."

An object or mesh may also be "inversely distorted", in that an "inverse deformation" is applied to the object or mesh in a manner that is generally opposite to a measured distortion resulting from a change in pose of a model. For example, in one case, if an edge distortion ratio indicates that a distorted edge is twice as long as the undistorted edge, then the inversely distorted edge may be half as long as the undistorted edge.

A "distortion ratio" may include any number, coefficient, or other indicator of the distortion of an edge from an initial pose to a second pose. For example, in some embodiments, an "edge distortion ratio" may be used to measure a ratio of the length of a distorted edge to the corresponding length of the undistorted edge.

A "corrected surface object" may include any surface object in a second pose whose position or shape has been corrected by first inversely distorting the surface object in the first pose, and then deforming the surface object to the second pose. Thus, typically, a corrected surface object may be less distorted than a distorted surface object.

An "animation variable" (also referred to as "avar") may include a variable or parameter that can be changed by a user and whose change in value affects a degree of change in a pose, e.g., the degree to which a deformation should be applied to surface objects.

DETAILED DESCRIPTION

Embodiments of the invention are directed to deformation of surface objects. Characters and other models comprising an underlying object and surface objects are often deformed into different poses in a computer animation. However, in some cases, it may be desirable for a surface object to deform to a different extent than an associated underlying object. For example, if the underlying object is flexible (e.g., skin or clothing), and the surface objects are rigid (e.g., plate armor), then it may be aesthetically displeasing for the surface objects to deform equally to the underlying object. To address this issue, the surface objects can be inversely distorted prior to performing a deformation on the model. Thus, when the model is deformed to a second pose, the surface objects may be distorted to a lesser extent than the underlying object. A user may direct the level of inverse distortion to adjust the degree of distortion of the corrected surface object in the second pose.

Embodiments can provide for many technical advantages. For example, embodiments can enable efficient deformation of surface objects of different rigidity than an underlying object being deformed. Simulation-based techniques are often computationally expensive and time-consuming, since various physical properties of the objects must be defined, modeled, and simulated for each deformation. In contrast, embodiments can measure the distortion of a surface object caused by a deformation and use inverse deformation parameters to determine an inversely distorted mesh. Thus, a surface object may be efficiently deformed in accordance with its perceived rigidity.

Embodiments can enable efficient deformation of a high-resolution surface object through the use of a lower-resolution coarse mesh of the surface object. In some cases, the full resolution of a surface object may be represented using a detailed fine mesh comprising thousands or millions of vertices and edges. Accordingly, processing the fine mesh may be computationally intensive. The coarse mesh of the surface object may be used to determine an inversely distorted coarse mesh, which may then be applied to the fine mesh to determine an inversely distorted fine mesh. Thus, the amount of processing required on the fine mesh can be decreased, reducing processing times and memory requirements.

Embodiments can allow a user to direct the distortion of surface objects. In some cases, strict realism (e.g., rigidity) of distortions may not be desirable; rather, it may be desired for deformation to be in accordance with a cartoonish or otherwise somewhat unrealistic art direction or animation style. For example, if an insect character is in an exaggerated stretched pose for a comedic scene, it may be desirable for exoskeletal surface objects to stretch accordingly. However, if the scene is intended to be serious, then a lower level of distortion may be desired. In some embodiments, a user may define inverse deformation parameters to indicate the amount of distortion of the surface objects. Thus, the distortion may be adjusted to match desired user preferences.

The above examples highlight only a few of the advantages of performing distortion of surface objects in accordance with embodiments of the invention.

I. Introduction

FIG. 1 shows an example model 100 in a first pose comprising an underlying object 101 and a plurality of surface objects 102-104. Each of objects 101-104 is comprised of a plurality of vertices, as indicated by the circles, and a plurality of edges, as indicated as lines between the circles. For example, underlying object 101 comprises 20 shown vertices and edges. Each of surface objects 102-104 comprises 8 shown vertices and edges. It should be noted that objects 101-104 may have additional vertices and edges that are not shown. In addition, although model 100 is two-dimensional for ease of illustration, embodiments may operate on models with any number of dimensions.

An animator may desire to deform model 100 to a second pose. In one example, the animator may want to bend model 100 to the right, such that the underlying object is distorted into the approximate shape of a quarter circle.

Figure 2:
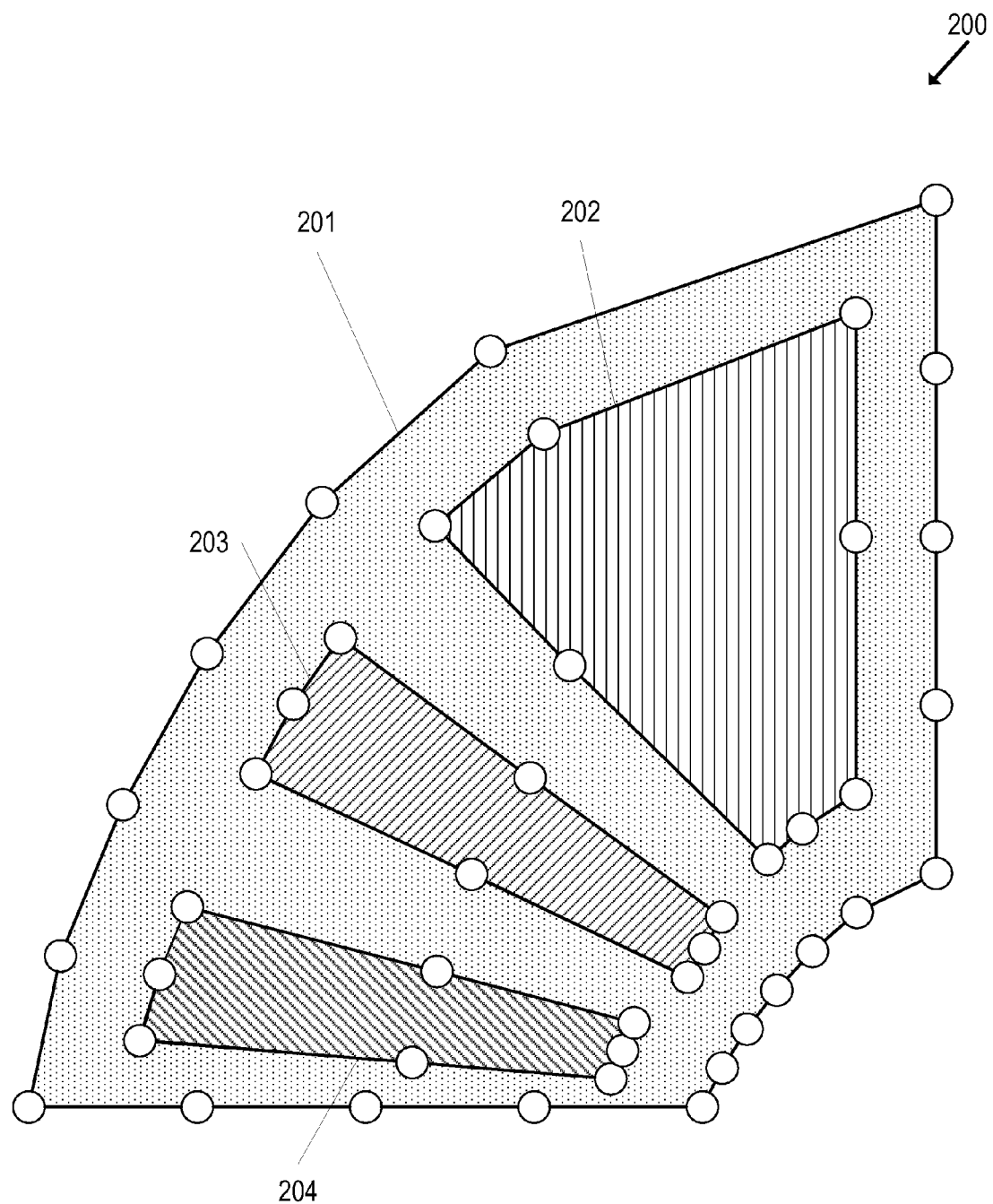
FIG. 2 shows an example distorted model in a second pose.

FIG. 2 shows an example distorted model 200 in a second pose. As shown, the distorted model 200 comprises the distorted underlying object 201 and distorted surface objects 202-204. The distorted objects 201-204 correspond to objects 101-104 in FIG. 1, respectively.

In some cases, the distortion of surface objects 202-204 in distorted model 200 may be undesirable. For example, model 100 may be used to represent a dinosaur, wherein the underlying object 101 may be the body of the dinosaur, and surface objects 102-104 may be scales on the back of the dinosaur. The second pose, as shown by distorted model 200, may represent the dinosaur leaning to the right. Although the position of the dinosaur's body (i.e., the underlying object 201) in the second pose may be desirable, the position of the scales (i.e., surface objects 202-204) may be undesirable as they are significantly distorted from the original. This may break immersion in the animation, because a viewer may typically regard an dinosaur scale as fairly rigid.

Figure 4:
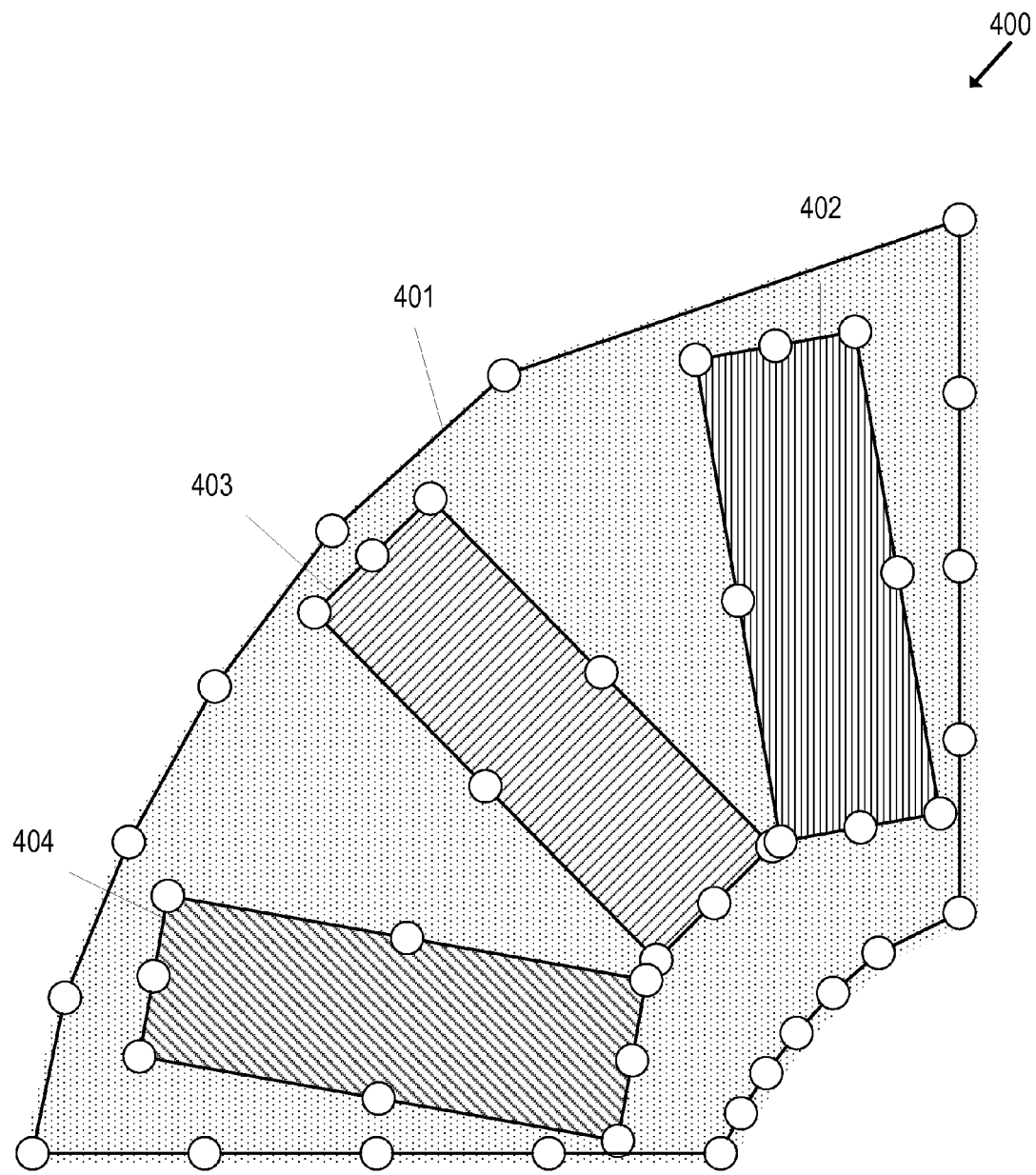
FIG. 4 shows an example model in a second pose comprising corrected surface objects according to embodiments of the present invention.

Embodiments can address this issue by providing systems and methods for distortion of surface objects. For example, in one embodiment, the surface objects in the second pose may be positioned as shown in FIG. 4, thus improving the appearance of the distorted pose.

II. Surface Object Distortion

To determine a desirable position of a surface object in a second pose, embodiments may first deform the model to the second pose and measure the distortion of the surface objects. This allows for the determination of the effect of the deformation on each vertex and edge comprising the surface object. For example, for the distorted surface objects 202-204, the distorted locations of the vertices and the distorted edge lengths may be determined. A distorted edge length may be divided by the corresponding initial edge length to determine a distortion ratio for each edge.

Figure 3:
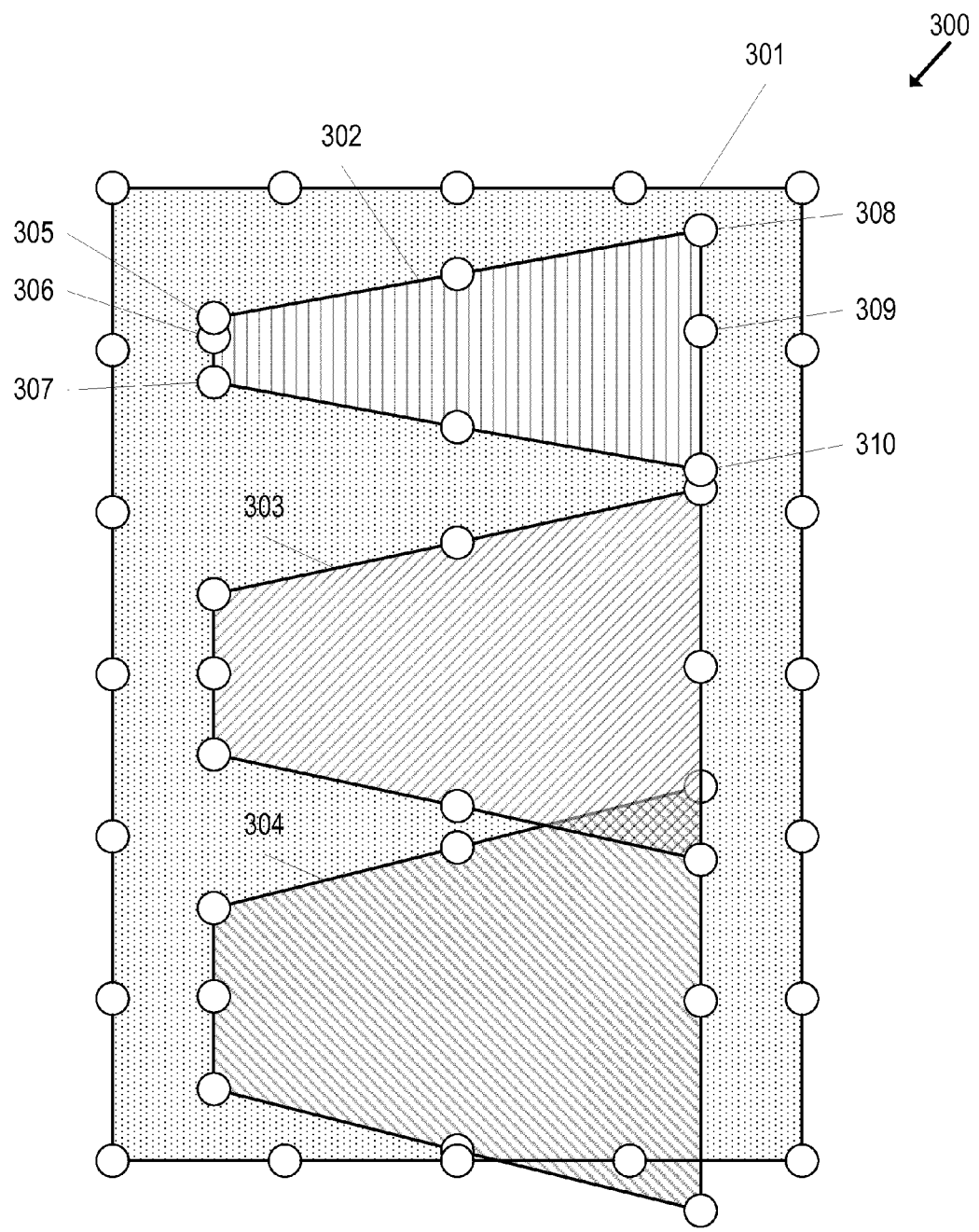
FIG. 3 shows an example model comprising inversely distorted surface objects according to embodiments of the present invention.

Once the distortion of a surface object is measured, an inverse deformation is applied to the surface object in the initial pose to generate an inversely distorted surface object. An example model 300 comprising inversely distorted surface objects 302-304 is shown in FIG. 3. Typically, lengths of the edges in the inversely distorted surface object will be determined so that when the inversely distorted surface object is deformed to the second pose, the length of each edge may be scaled by a user-specified fraction of the distortion ratio. Thus, in effect, the edge lengths in the inversely distorted surface object may be chosen to counteract some or all of the distortion caused by deforming the surface object into the second pose.

For example, as shown for inversely distorted surface object 302, the edge between vertices 305 and 306, and the edge between vertices 306 and 307 are shortened, since the corresponding edges in distorted surface object 202 are lengthened. Conversely, the edge between vertices 308 and 309, and the edge between vertices 309 and 310 are lengthened, as the corresponding edges in distorted surface object 202 are shortened. This is done so that when the surface object is deformed, the edges will have lengths approximately equal to their original lengths.

Once a model comprising inversely distorted surface objects is determined, the model may be deformed into a second pose comprising corrected surface objects. An example model 400 in the second pose comprising corrected surface objects is shown in FIG. 4. As shown, the underlying object 401 is deformed into the second pose. Corrected surface objects 402-404 are repositioned and reoriented from the initial pose, and are not substantially distorted.

III. Surface Object Distortion Methods

Figure 5:
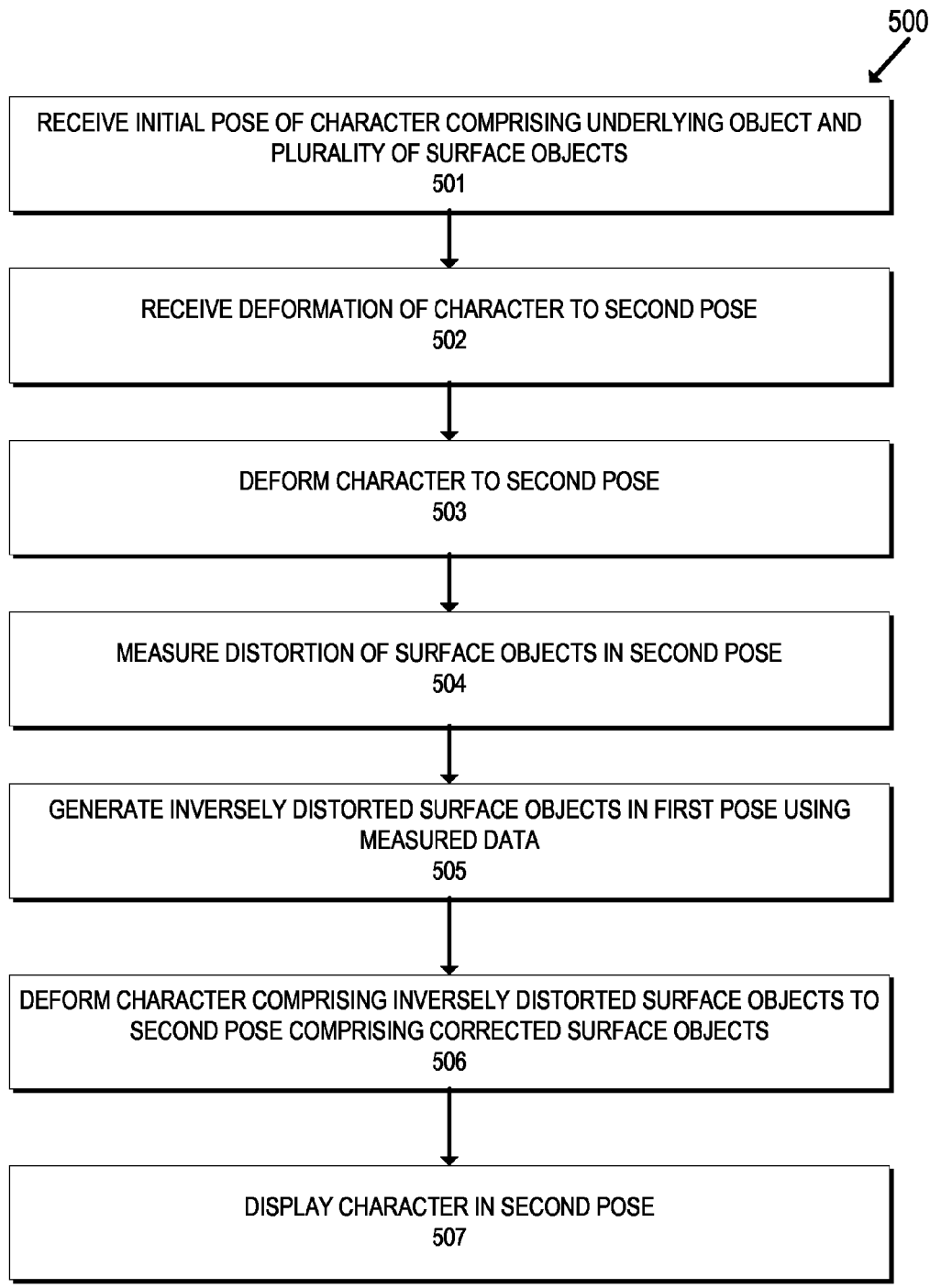
FIG. 5 shows a method of deforming a plurality of surface objects to a second pose according to embodiments of the present invention.

FIG. 5 shows a method of deforming a plurality of surface objects to a second pose according to embodiments of the present invention. All or some of the steps can be performed by a computer system, including various subcomponents of a computer system.

At step 501, an initial pose of a character is received comprising an underlying object and one or more surface objects. An example initial pose of a character 100 is shown in FIG. 1. As shown in FIG. 1, the character may comprise an underlying object 101 and a plurality of surface objects 102-104. The surface objects 102-104 may be attached to underlying object 101 in any suitable manner. For example, one or more coordinates may be specified for binding a surface object to a corresponding location on the underlying object. The initial pose of the character may be in a neutral or relaxed state, or in any other suitable state. The underlying object and surface objects may each comprise a "mesh" comprising the vertices and edges of the object. In the shown figure, each surface object 102-104 comprises 8 vertices and edges, but may also comprise additional vertices and edges (not shown), as indicated by the shading.

At step 502, a deformation of the character to a second pose is received. In some embodiments, an animator or other user may specify the second pose of the character. In some cases, the animator may use rigging or controls to manipulate the position of the character. In other cases, the animator may specify a transformation, such as a linear transformation in 3-D space, that may modify the positions of the vertices comprising the character. In yet other cases, the animator may individually modify the positions of the vertices.

In some embodiments, the deformation may generally be expressed as a function of each vertex comprising the model. For example, let a vertex $v=(v_x, v_y, v_z)$, where $v_x$ is the position of the vertex in the x-axis, $v_y$ is the position of the vertex in the y-axis, and $v_z$ is the position of the vertex in the z-axis. A deformation function may be expressed as $f_D(v)=(v'_x, v'_y, v'_z)$, where $v'_x$, $v'_y$, and $v'_z$ are the distorted positions of the vertex in the x-, y-, and z-axes, respectively. Analogously, an undistorted or original edge may be referred to as $E=(v_1, v_2)$, and a distorted edge may be referred to as $E'=(v'_1, v'_2)$.

At step 503, the character is deformed to the second pose. An example distorted second pose of the character 200 is shown in FIG. 2. As shown in distorted pose 200, the character may be deformed to bend to the right in approximately the shape of a quarter circle. As the character is deformed, the underlying object 201 and surface objects 202-204 are distorted. For example, the edges of the surface objects closer to the left perimeter of the underlying object have generally lengthened, whereas those edges closer to the right perimeter have generally shortened.

At step 504, the distortion of the surface objects in the second pose is measured. In some embodiments, the distorted locations of the vertices and the distorted edge lengths may be determined. In addition, an edge distortion ratio may be determined for each edge by dividing the distorted edge length by the corresponding initial edge length. Methods for measuring the distortion of a surface object in some embodiments are described in additional detail in FIG. 6.

At step 505, inversely distorted surface objects are generated using the measured data. An example model 300 comprising inversely distorted surface objects 302-304 is shown in FIG. 3. Typically, lengths of the edges in the inversely distorted surface object will be determined so that when the inversely distorted surface object is deformed to the second pose, the length of each edge will be a user-specified fraction or multiple of the distortion ratio. Thus, in effect, the edge lengths in the inversely distorted surface object may be chosen to counteract some or all of the distortion caused by deforming the surface object into the second pose. Methods for generating an inversely distorted surface object in some embodiments are described in additional detail in FIG. 7.

As shown for inversely distorted surface object 302, the edge between vertices 305 and 306, and the edge between vertices 306 and 307 are shortened, since the corresponding edges in distorted surface object 202 are lengthened. Similarly, the edge between vertices 308 and 309, and the edge between vertices 309 and 310 are lengthened, as the corresponding edges in distorted surface object 202 are shortened.

At step 506, the character comprising the inversely distorted surface object is deformed to the second pose. Typically, the same deformation determined in step 502 and performed in step 503 is performed again on the character comprising the underlying object and inversely distorted surface objects.

At step 507, the character is displayed in the second pose with corrected surface objects. An example model 400 in the second pose comprising corrected surface objects is shown in FIG. 4. As shown, the underlying object is distorted to the second pose as in step 503. Corrected surface objects 402-404 are repositioned and reoriented from the initial pose. However, unlike in the result of step 503, the surface objects are not substantially distorted. The character may be displayed in any suitable context. For example, the character may be displayed in the second pose in computer aided design software. Alternately, the character may be displayed in the second pose in a frame in an animation.

A. Distortion Measurement Methods

In some embodiments, a coarse mesh may be used to measure the distortion of surface objects. A "coarse mesh" may include any simpler or more efficient mesh representation of a surface object, so that the general size and structure of the surface object is defined, but the level of detail of the coarse mesh is less than that of the surface object. In some embodiments, the coarse mesh may comprise a subset of the vertices and edges of the fine mesh. In one example, the coarse mesh may only comprise vertices at the corners of the surface object. Thus, as the coarse mesh is less complicated, it may be stored using less memory and processed more quickly.

Figure 6:
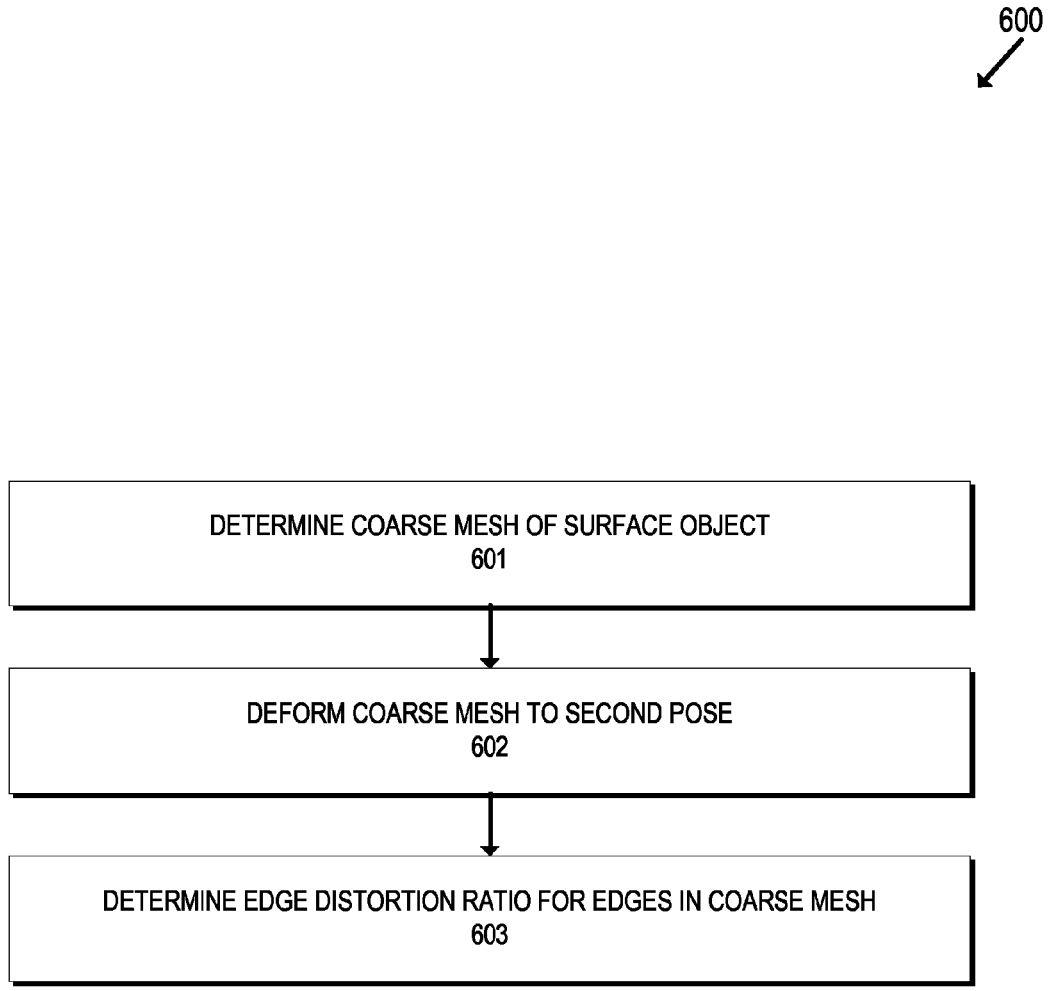
FIG. 6 shows a method for measuring the distortion of a surface object using a coarse mesh according to embodiments of the present invention.

FIG. 6 shows a method 600 for measuring the distortion of a surface object using a coarse mesh. In some embodiments, method 600 may be performed during step 504 of method 500.

At step 601, a coarse mesh associated with the surface object is determined. For example, in some embodiments, a user or animator may pre-define a surface object coarse mesh and associate certain vertices or positions in the surface object coarse mesh with corresponding vertices or positions in a full-resolution (i.e., fine) surface object mesh.

Figure 7:
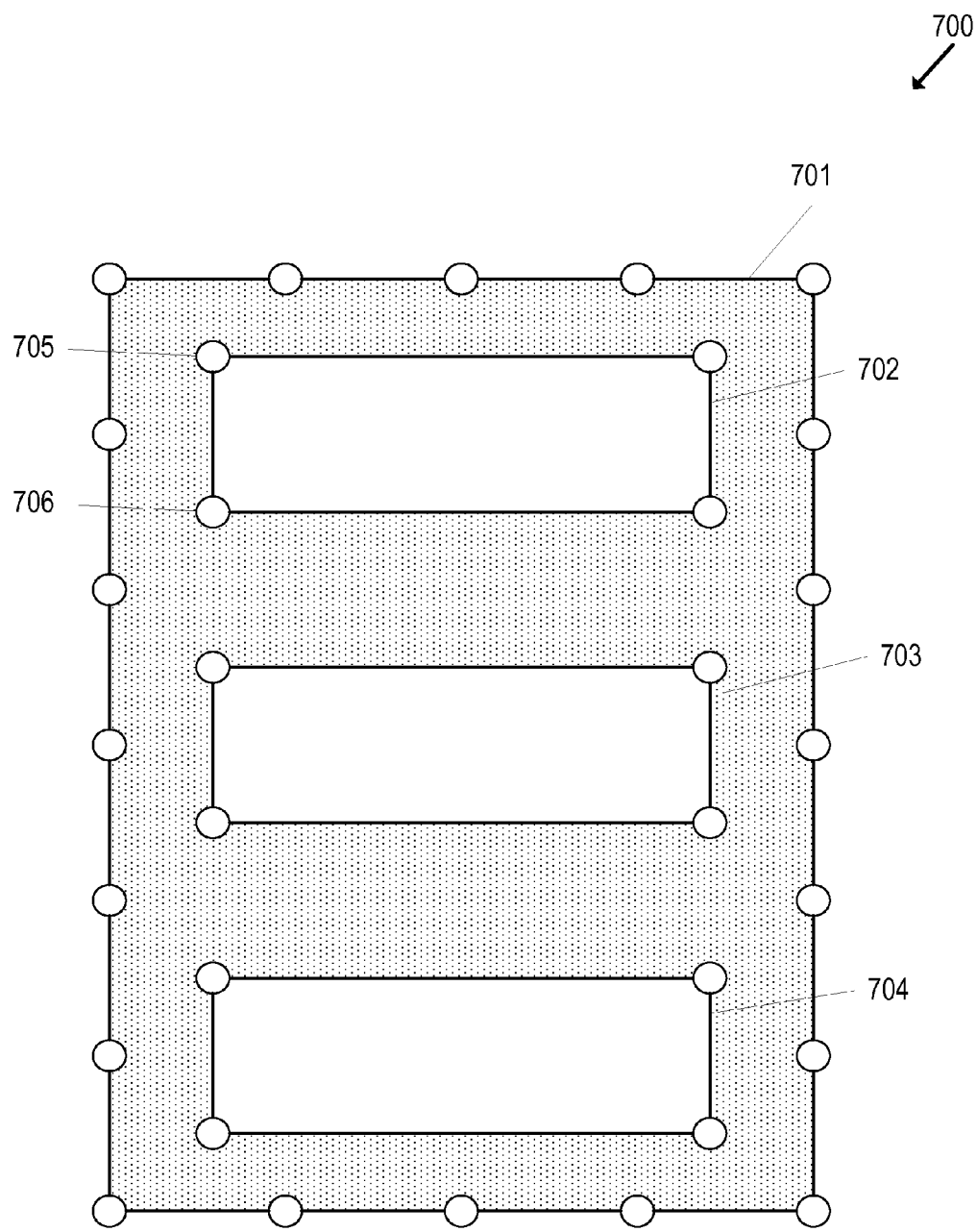
FIG. 7 shows a character comprising surface object coarse meshes according to embodiments of the present invention.

A character comprising surface object coarse meshes 702-704 is shown in FIG. 7. As shown, surface object coarse meshes 702-704 have a similar shape to the surface object fine meshes 102-104 in FIG. 1. However, whereas surface object fine meshes 102-104 comprise 8 shown vertices and edges (and possibly a number of vertices and edges that are not shown), coarse meshes 702-704 comprise only 4 vertices and edges each, as indicated by the absence of shading. Thus, although the coarse meshes bound roughly the same area, their level of detail may be considerably less.

Figure 8:
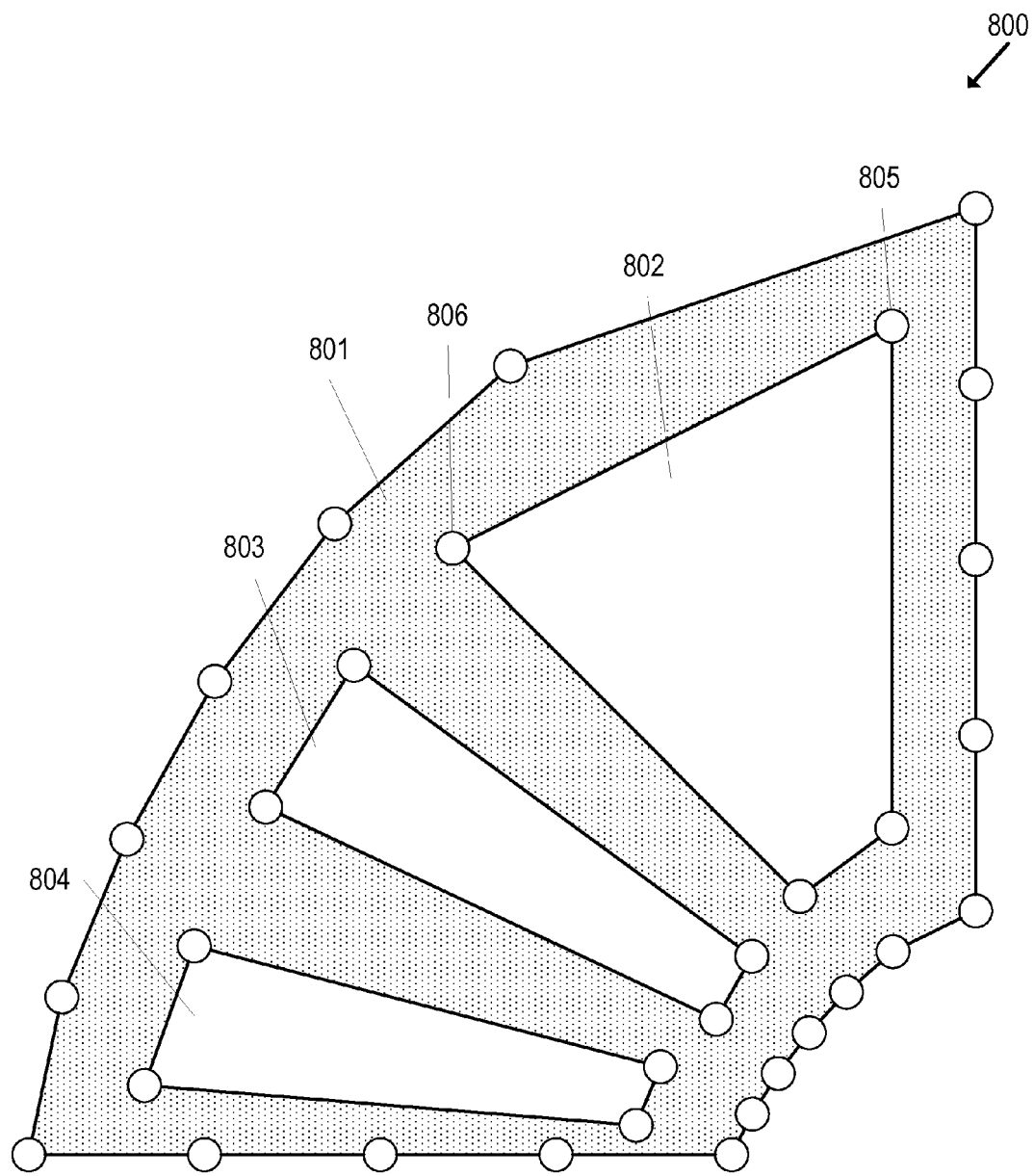
FIG. 8 shows an example second pose of a character with distorted surface object coarse meshes according to embodiments of the present invention.

At step 602, the surface object coarse mesh is deformed to a second pose to generate a distorted surface object coarse mesh. In some embodiments, the second pose may be specified, for example, by a user or animator and received as described for step 502 of method 500. An example second pose of a character 800 with distorted surface object coarse meshes 802-804 is shown in FIG. 8.

At step 603, an edge distortion ratio is determined for each edge in the surface object coarse mesh. An "edge distortion ratio" may include any number, coefficient, or other indicator of the distortion of an edge from an initial pose to a second pose. In some embodiments, the edge distortion ratio D(E) for an edge E may be calculated by dividing the length of an edge in the distorted surface object coarse mesh, len(E'), by the corresponding edge in the original surface object coarse mesh, len(E). Thus, $$D(E) = \frac{len(E')}{len(E)}.$$

For example, an edge between vertices 705 and 706 in initial pose 700 may be 0.9 units. The corresponding edge between vertices 805 and 806 may be 3.0 units. Accordingly, the edge distortion ratio for the edge D(E)=3.0/0.9=3.33. In other words, the edge in the distorted pose is approximately 3.33 times longer than the edge in the initial pose.

B. Inversely Distorted Surface Object Generation Methods

Figure 9:
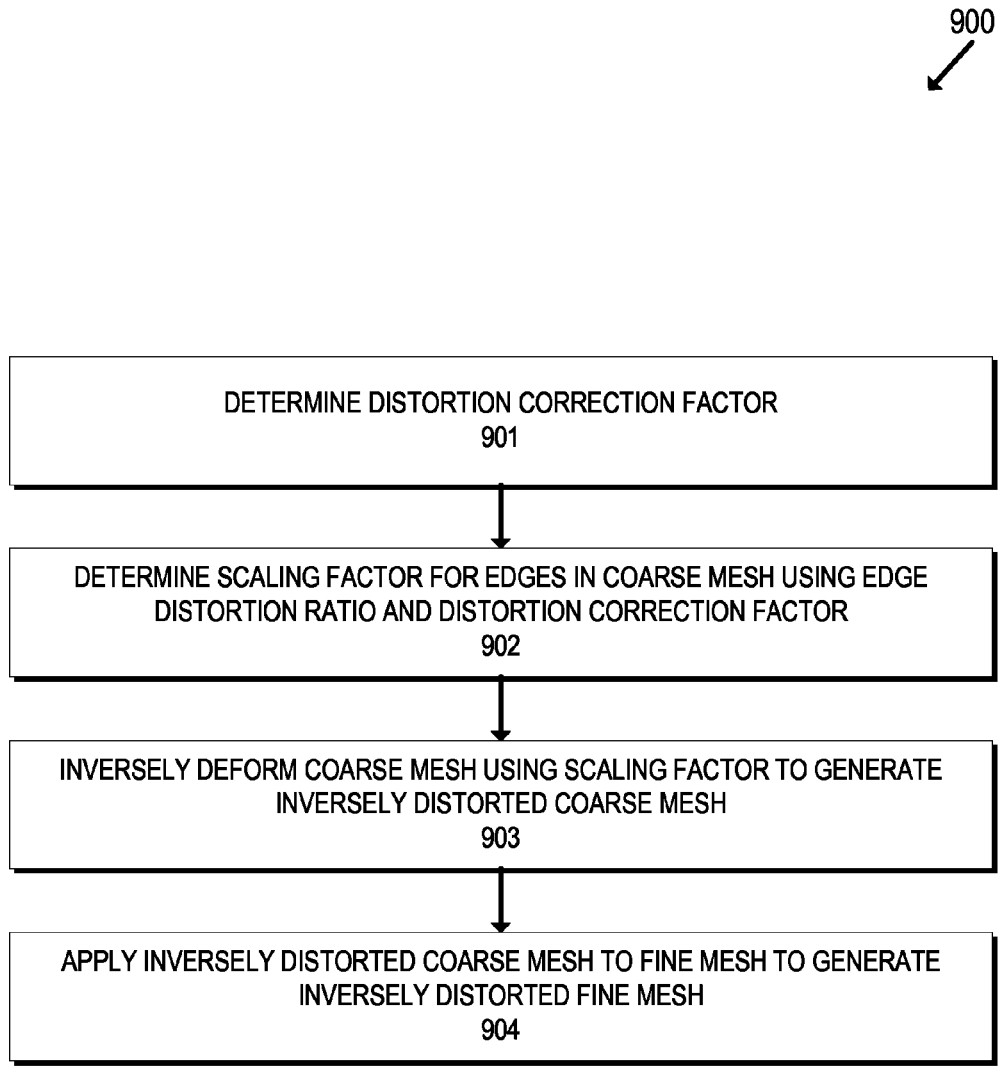
FIG. 9 shows a method for generating an inversely distorted surface object according to embodiments of the present invention.

FIG. 9 shows a method 900 for generating an inversely distorted surface object. In some embodiments, method 900 may be performed during step 505 of method 500.

At step 901, a distortion correction factor is determined. A "distortion correction factor" may include a number, coefficient, or other indication of the degree to which distortion of a surface object should be mitigated. In some embodiments, the distortion correction factor may be a positive number between 0 and 1. A correction factor of 0 may indicate that the corrected surface object should be fully distorted in the second pose (i.e., distorted to the same extent as the underlying object during a deformation). For example, a correction factor of 0 may cause the character in the second pose to appear as shown in FIG. 2. A correction factor of 1 indicates that the corrected surface object should be undistorted in the second pose (i.e., so that the appearance of the surface object is similar to that in the first pose). For example, a correction factor of 1 may cause the character in the second pose to appear as shown in FIG. 4. A correction factor between 0 and 1 may indicate a partial distortion of the surface object (i.e., so that the surface object is distorted in the second pose, but not to the same extent as the underlying object).

In some embodiments, the correction factor may be defined by a user such as an animator. For example, the user may set an animation variable (avar) or control when performing a deformation to indicate the correction factor applied to the surface objects. In some embodiments, the correction factor may be individually specified for each surface object. In addition, in some embodiments, a separate correction factor may be specified for each dimension (e.g., the x-, y-, and z-axes).

At step 902, a scaling factor is determined for each edge in the coarse mesh using the correction factor and an edge distortion ratio corresponding to the edge. A "scaling factor" may include a number, coefficient, or other indication of the degree to which an edge length should be inversely deformed to generate an inversely distorted surface object mesh. In some embodiments, the scaling factor $$S(E) = 1 + C \times \left(\frac{1}{D(E)} - 1\right),$$

where C is the correction factor and D(E) is the edge distortion ratio for an edge E.

In one example, the length of the edge between vertices 705 and 706 in an initial pose of a character 700 is 0.9. The length of the corresponding edge between vertices 805 and 806 in the distorted pose of the character 800 is 3.0. Subsequently, as described for step 603, the distortion ratio D(E) is calculated to be 3.33. If the user indicates that the correction factor C=0.5, then the scaling factor $$S(E) = 1 + 0.5 \times \left(\frac{1}{3.33} - 1\right) \approx 0.65.$$

Alternately, if the user indicates that C=1, the distortion is fully corrected by the inverse deformation. Accordingly, the scaling facto $$S(E) = 1 + 1 \times \left(\frac{1}{3.33} - 1\right) \approx 0.3.$$

At step 903, each edge in the coarse mesh is scaled using the corresponding scaling factor to generate an inversely distorted coarse mesh. In some embodiments, the length of an edge $\text{len}(E_{inv}) = \text{len}(E) \times S(E)$. In other words, the length of an edge in the inversely distorted coarse mesh is the product of the length of the edge in the undistorted coarse mesh and the scaling factor for the edge.

Figure 10:
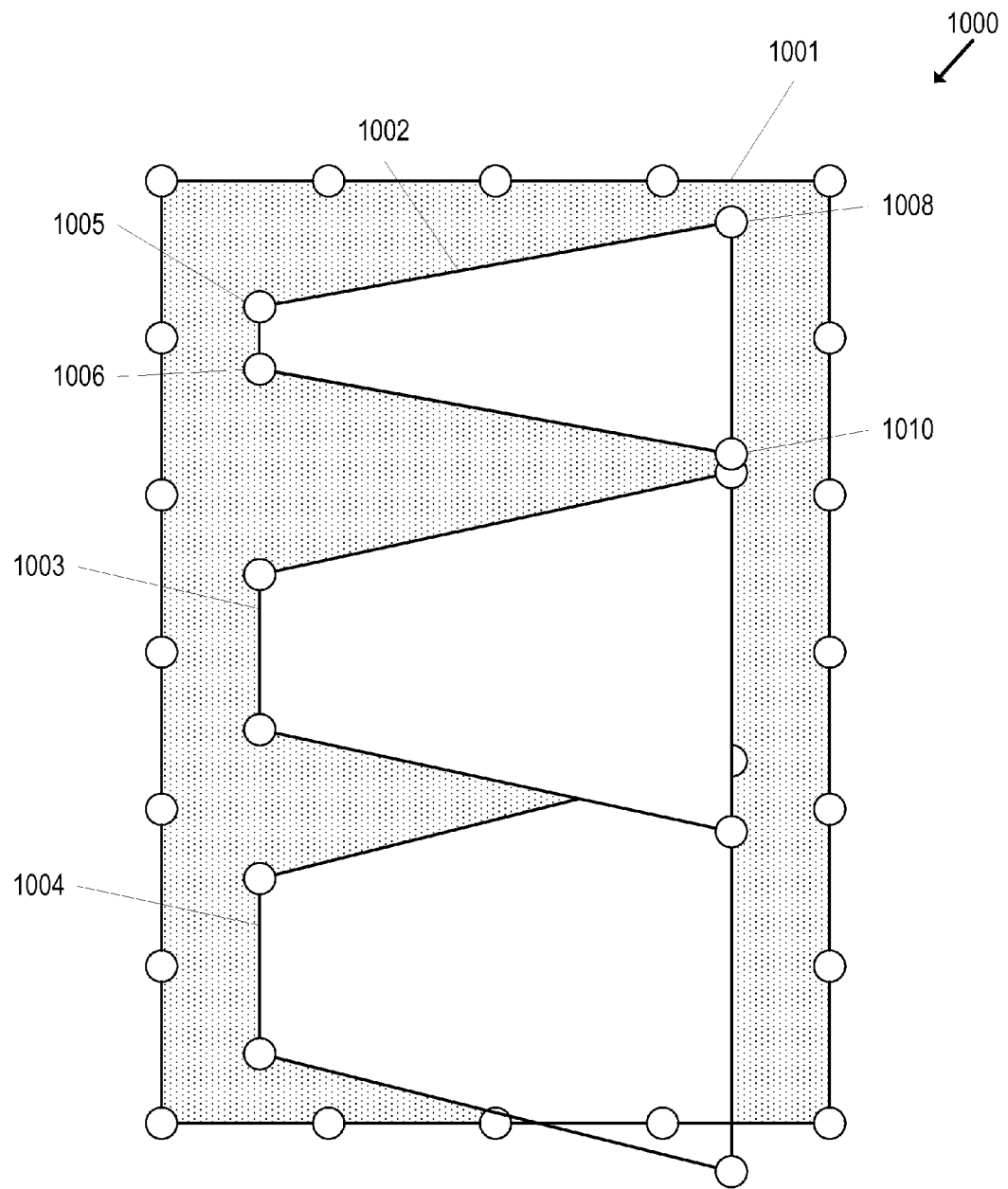
FIG. 10 shows an example character comprising inversely distorted coarse meshes according to embodiments of the present invention.

An example character 1000 comprising inversely distorted coarse meshes 1002-1004 is shown in FIG. 10. In the shown figure, the correction factor C=1. As shown, the edge between vertices 1005 and 1006 in coarse mesh 1002 is reduced in length to approximately 30% of length of the initial surface object, in accordance with the scaling factor calculated above for the edge. Conversely, the edge between vertices 1007 and 1008 is increased in length, reflecting the fractional distortion ratio D(E) for the edge.

At step 904, the inversely distorted coarse mesh is applied to a fine mesh of the surface object to generate an inversely distorted fine mesh. In some embodiments, the coarse mesh may be applied using a mapping between vertices in the coarse mesh and vertices in the fine mesh, so that the position of a vertex in the fine mesh is a function of the positions of one or more vertices in the coarse mesh. For example, in one embodiment, the position of a vertex in the fine mesh may be calculated by taking a weighted average of the positions of the closest vertices in the coarse mesh, wherein a vertex is given higher weight if it is closer to the vertex in the fine mesh. Thus, the inversely distorted positions of the vertices in the coarse mesh may be evenly blended to the fine mesh.

For example, consider a vertex 109 in a fine mesh of surface object 102. In one embodiment, the position of vertex 109 may be represented in Cartesian coordinates as (7,2), wherein the origin is at the top-left of the underlying object. Adjacent to vertex 109 in surface object 102 are vertex 108 at (7,1), and vertex 110 at (7,3). An inversely distorted coarse mesh 1002 may be generated for fine mesh 102. The inversely distorted coarse mesh 1002 may comprise vertex 1008 at position (7,0.3), and vertex 1010 at position (7,3.5). Vertex 1008 may correspond to vertex 108 in the fine mesh 102, and vertex 1010 may correspond to vertex 110. Determining the positions of vertices 308 and 310 in an inversely distorted fine mesh is straightforward—the positions are those of the corresponding vertices 1008 and 1010 in the inversely distorted coarse mesh. However, determining the position of a vertex 309 not present in the coarse mesh may involve calculating an average of the positions of nearby vertices 308 and 310, weighted by the distance from the vertex 309 in the undistorted fine mesh 102. Since, both vertices 108 and 110 are 1 distance from vertex 109 in mesh 102, each vertex may be given equal weight. Thus, the y-coordinate of vertex 309 may be expressed as $y_{v309} = (½) \times y_{v308} + (½) \times y_{v310} = (½)(0.3) + (½)(3.5) = 1.9$. Similarly, the x-coordinate of vertex 309 may be expressed as $x_{v309} = (½) \times x_{v308} + (½) \times x_{v310} = (½)(7) + (½)(7) = 7$. Therefore, the position of vertex 309 may be determined as (7,1.9). The positions of other vertices in fine mesh 302 may be determined analogously.

In other embodiments, application of the coarse mesh onto the fine mesh may be performed using a subdivision warp, wrap deformer, or any other suitable algorithm.

An example inversely distorted fine mesh is shown in FIG. 3. As shown, the inverse distortion is blended into the fine mesh evenly, so that the general shape of the inversely distorted fine mesh is similar to that of the coarse mesh, but more detailed.

IV. Additional Embodiments

It should be noted that although embodiments are described for the above methods, they are not so limited. For example, although the above methods recite the use of a "character", in other embodiments any suitable model may be used. The model may represent a character, an inanimate object, an item, a part of a scene, or any other suitable entity.

In addition, it should be noted that although examples for the correction factor C were given between 0 and 1, C may be any suitable real number. For example, a value C>1 may represent an overcorrection for a distortion, such that corrected surface objects in a second pose will be distorted in an opposite manner to the distortion. This may be useful in certain scenarios, such as if a superhero character with a cape surface object is falling. In such a case, the body of the character may be stretched downward to emphasize the falling motion, but the cape may be stretched upward to reflect the additional drag on the cape. Analogously, a value of C<0 may represent an exaggeration of a distortion. This may be especially useful for surface objects that are more flexible than the underlying object. For example, if the superhero character is flying through the sky, the body of the character may be stretched horizontally, whereas the cape may be stretched to a greater extent to emphasize speed.

It should also be noted that although steps 504 and 505 of method 500 are described in FIGS. 6 and 9 as using coarse meshes, the invention is not so limited. For example, in some embodiments, the distortion may be directly measured using a full-resolution fine mesh of a surface object, and the surface object fine mesh may be inversely deformed directly rather than through an application of the coarse mesh to the fine mesh. Although such a procedure may typically be more computationally expensive, it may provide improved detail.

Furthermore, although both the methods of FIG. 6 and FIG. 9 make use of coarse meshes, they do not need to be used together. For example, some embodiments may measure distortion using coarse meshes, but perform an inverse distortion directly on a fine mesh. Conversely, some embodiments may measure distortion of a distorted surface object fine mesh, but may generate an inversely distorted coarse mesh and apply the coarse mesh to a fine mesh (e.g., for efficiency purposes).

V. System

Figure 11:
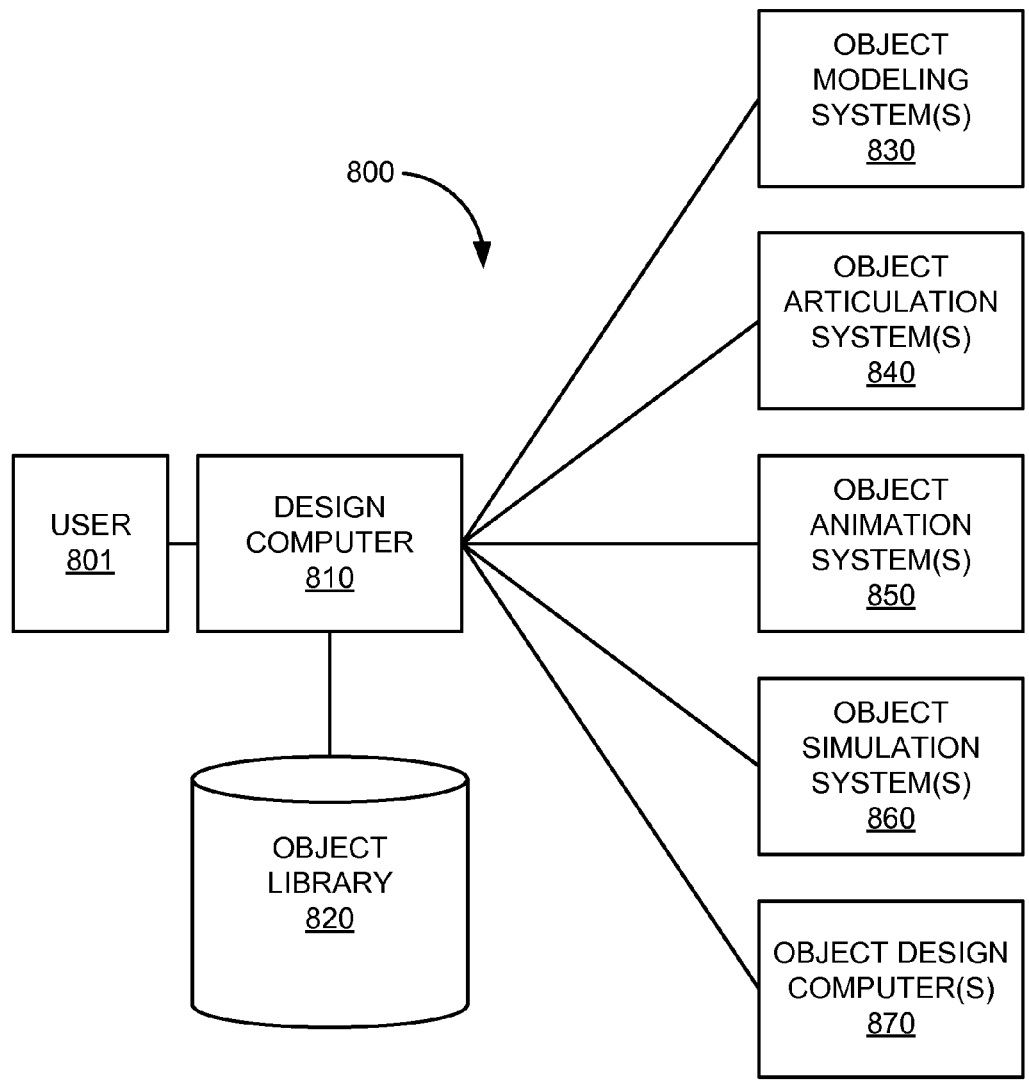
FIG. 11 is a simplified block diagram of system for creating computer graphics imagery (CGI) and computer-aided animation that may implement or incorporate various embodiments.

FIG. 11 is a simplified block diagram of system 1100 for creating computer graphics imagery (CGI) and computer-aided animation that may implement or incorporate various embodiments. In this example, system 1100 can include one or more design computers 1110, object library 1120, one or more object modeler systems 1130, one or more object articulation systems 1140, one or more object animation systems 1150, one or more object simulation systems 1160, and one or more object rendering systems 1170. Any of the systems 1130-1170 may be invoked by or used directly by a user of the one or more design computers 1110 and/or automatically invoked by or used by one or more processes associated with the one or more design computers 1110. Any of the elements of system 1100 can include hardware and/or software elements configured for specific functions.

The one or more design computers 1110 can include hardware and software elements configured for designing CGI and assisting with computer-aided animation. Each of the one or more design computers 1110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 1110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 1110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 1110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 1110 acting as an animator may employ one or more systems or tools to specify motion and position of one or more objects over time to produce an animation.

Object library 1120 can include elements configured for storing and accessing information related to objects used by the one or more design computers 1110 during the various stages of a production process to produce CGI and animation. Some examples of object library 1120 can include a file, a database, or other storage devices and mechanisms. Object library 1120 may be locally accessible to the one or more design computers 1110 or hosted by one or more external computer systems.

Some examples of information stored in object library 1120 can include an object itself, metadata, object geometry, object topology, rigging, control data, animation data, animation cues, simulation data, texture data, lighting data, shader code, or the like. An object stored in object library 1120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 1130 can include hardware and/or software elements configured for modeling one or more objects. Modeling can include the creating, sculpting, and editing of an object. In various embodiments, the one or more object modeling systems 1130 may be configured to generated a model to include a description of the shape of an object. The one or more object modeling systems 1130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 1130 may further generate model data (e.g., 2D and 3D model data) for use by other elements of system 1100 or that can be stored in object library 1120. The one or more object modeling systems 1130 may be configured to allow a user to associate additional information, metadata, color, lighting, rigging, controls, or the like, with all or a portion of the generated model data.

The one or more object articulation systems 1140 can include hardware and/or software elements configured to articulating one or more computer-generated objects. Articulation can include the building or creation of rigs, the rigging of an object, and the editing of rigging. In various embodiments, the one or more object articulation systems 1140 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 1140 may further generate articulation data (e.g., data associated with controls or animations variables) for use by other elements of system 1100 or that can be stored in object library 1120. The one or more object articulation systems 1140 may be configured to allow a user to associate additional information, metadata, color, lighting, rigging, controls, or the like, with all or a portion of the generated articulation data.

The one or more object animation systems 1150 can include hardware and/or software elements configured for animating one or more computer-generated objects. Animation can include the specification of motion and position of an object over time. The one or more object animation systems 1150 may be invoked by or used directly by a user of the one or more design computers 1110 and/or automatically invoked by or used by one or more processes associated with the one or more design computers 1110.

In various embodiments, the one or more animation systems 1150 may be configured to enable users to manipulate controls or animation variables or utilized character rigging to specify one or more key frames of animation sequence. The one or more animation systems 1150 generate intermediary frames based on the one or more key frames. In some embodiments, the one or more animation systems 1150 may be configured to enable users to specify animation cues, paths, or the like according to one or more predefined sequences. The one or more animation systems 1150 generate frames of the animation based on the animation cues or paths. In further embodiments, the one or more animation systems 1150 may be configured to enable users to define animations using one or more animation languages, morphs, deformations, or the like.

The one or more object animations systems 1150 may further generate animation data (e.g., inputs associated with controls or animations variables) for use by other elements of system 1100 or that can be stored in object library 1120. The one or more object animations systems 1150 may be configured to allow a user to associate additional information, metadata, color, lighting, rigging, controls, or the like, with all or a portion of the generated animation data.

The one or more object simulation systems 1160 can include hardware and/or software elements configured for simulating one or more computer-generated objects. Simulation can include determining motion and position of an object over time in response to one or more simulated forces or conditions. The one or more object simulation systems 1160 may be invoked by or used directly by a user of the one or more design computers 1110 and/or automatically invoked by or used by one or more processes associated with the one or more design computers 1110.

In various embodiments, the one or more object simulation systems 1160 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 1160 may be used to simulate the behavior of objects, such as hair, fur, and cloth, in response to a physics model and/or animation of one or more characters and objects within a computer-generated scene.

The one or more object simulation systems 1160 may further generate simulation data (e.g., motion and position of an object over time) for use by other elements of system 100 or that can be stored in object library 1120. The generated simulation data may be combined with or used in addition to animation data generated by the one or more object animation systems 150. The one or more object simulation systems 1160 may be configured to allow a user to associate additional information, metadata, color, lighting, rigging, controls, or the like, with all or a portion of the generated simulation data.

The one or more object rendering systems 1170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 1170 may be invoked by or used directly by a user of the one or more design computers 1110 and/or automatically invoked by or used by one or more processes associated with the one or more design computers 1110. One example of a software program embodied as the one or more object rendering systems 1170 can include PhotoRealistic RenderMan, or PRMan, produced by Pixar Animations Studios of Emeryville, Calif.

In various embodiments, the one or more object rendering systems 1170 can be configured to render one or more objects to produce one or more computer-generated images or a set of images over time that provide an animation. The one or more object rendering systems 1170 may generate digital images or raster graphics images.

In various embodiments, a rendered image can be understood in terms of a number of visible features. Some examples of visible features that may be considered by the one or more object rendering systems 1170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 1170 may further render images (e.g., motion and position of an object over time) for use by other elements of system 1100 or that can be stored in object library 1120. The one or more object rendering systems 1170 may be configured to allow a user to associate additional information or metadata with all or a portion of the rendered image.

Figure 12:
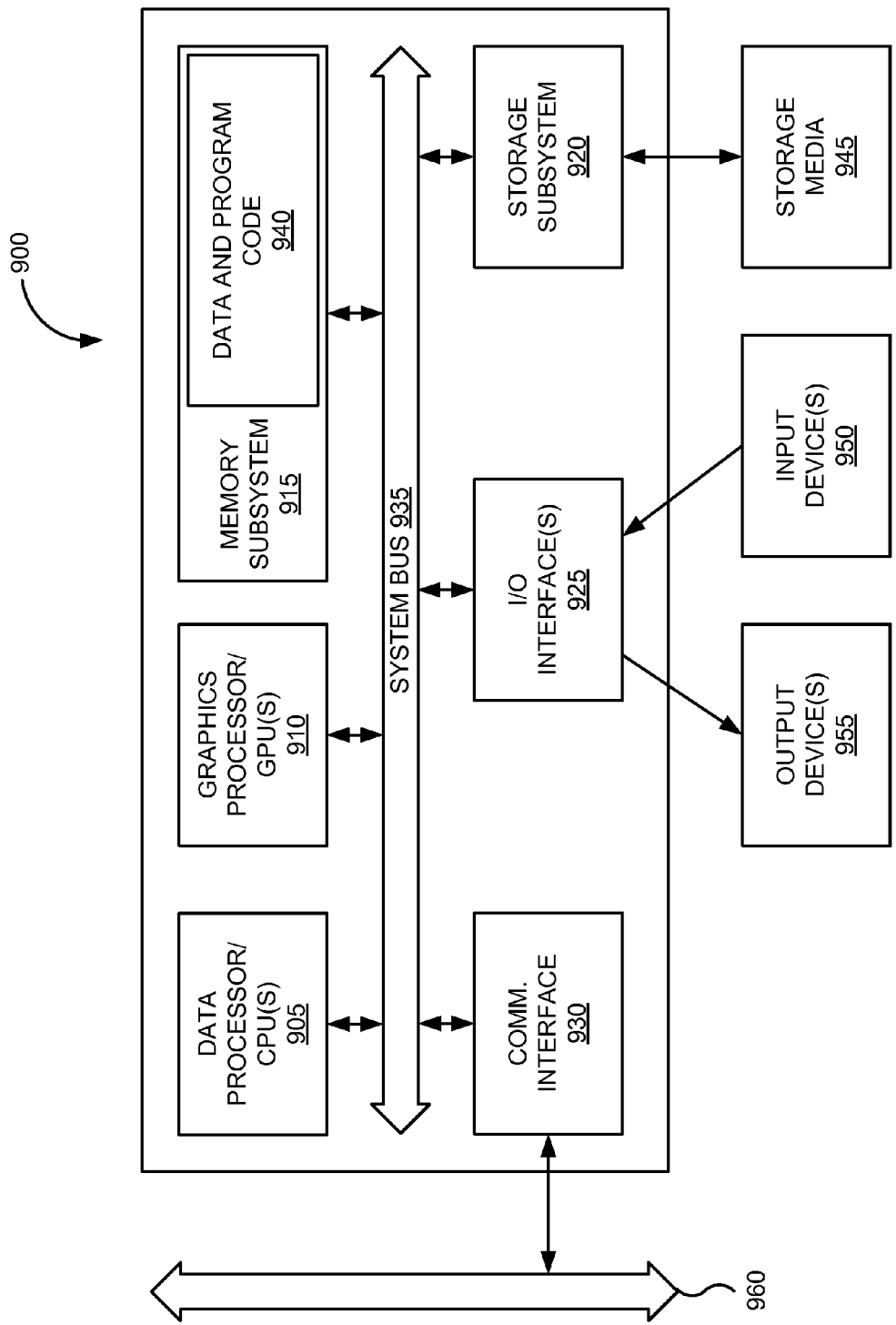
FIG. 12 is a block diagram of a computer system according to embodiments of the present invention.

FIG. 12 is a block diagram of computer system 1200. FIG. 12 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1200 and any of its components or subsystems can include hardware and/or software elements configured for performing methods described herein.

Computer system 1200 may include familiar computer components, such as one or more one or more data processors or central processing units (CPUs) 1205, one or more graphics processors or graphical processing units (GPUs) 1210, memory subsystem 1215, storage subsystem 1220, one or more input/output (I/O) interfaces 1225, communications interface 1230, or the like. Computer system 1200 can include system bus 1235 interconnecting the above components and providing functionality, such connectivity and inter-device communication.

The one or more data processors or central processing units (CPUs) 1205 can execute logic or program code or for providing application-specific functionality. Some examples of CPU(s) 1205 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 1210 can execute logic or program code associated with graphics or for providing graphics-specific functionality. GPUs 1210 may include any conventional graphics processing unit, such as those provided by conventional video cards. In various embodiments, GPUs 1210 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1210 may include any number of registers, logic units, arithmetic units, caches, memory interfaces, or the like.

Memory subsystem 1215 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1215 can include data and program code 1240.

Storage subsystem 1220 can also store information using machine-readable articles, information storage devices, or computer-readable storage media. Storage subsystem 1220 may store information using storage media 1245. Some examples of storage media 1245 used by storage subsystem 1220 can include floppy disks, hard disks, optical storage media such as CD-ROMS, DVDs and bar codes, removable storage devices, networked storage devices, or the like. In some embodiments, all or part of data and program code 1240 may be stored using storage subsystem 1220.

The one or more input/output (I/O) interfaces 1225 can perform I/O operations. One or more input devices 1250 and/or one or more output devices 1255 may be communicatively coupled to the one or more I/O interfaces 1225. The one or more input devices 1250 can receive information from one or more sources for computer system 1200. Some examples of the one or more input devices 1250 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1250 may allow a user of computer system 1200 to interact with one or more non-graphical or graphical user interfaces to enter a comment, select objects, icons, text, user interface widgets, or other user interface elements that appear on a monitor/display device via a command, a click of a button, or the like.

The one or more output devices 1255 can output information to one or more destinations for computer system 1200. Some examples of the one or more output devices 1255 can include a printer, a fax, a feedback device for a mouse or joystick, external storage systems, a monitor or other display device, a communications interface appropriately configured as a transceiver, or the like. The one or more output devices 1255 may allow a user of computer system 1200 to view objects, icons, text, user interface widgets, or other user interface elements. A display device or monitor may be used with computer system 1200 and can include hardware and/or software elements configured for displaying information.

Communications interface 1230 can perform communications operations, including sending and receiving data. Some examples of communications interface 1230 may include a network communications interface (e.g. Ethernet, Wi-Fi, etc.). For example, communications interface 1230 may be coupled to communications network/external bus 1260, such as a computer network, a USB hub, or the like. A computer system can include a plurality of the same components or subsystems, e.g., connected together by communications interface 1230 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1200 may also include one or more applications (e.g., software components or functions) to be executed by a processor to execute, perform, or otherwise implement techniques disclosed herein. These applications may be embodied as data and program code 1240. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1215 and/or storage subsystem 1220.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order.

Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments. However, other embodiments may be directed to specific embodiments relating to each individual aspect, or specific combinations of these individual aspects.

The above description of example embodiments has been presented for the purposes of illustration and description. It is not intended to be exhaustive or to limit the invention to the precise form described, and many modifications and variations are possible in light of the teaching above. The embodiments were chosen and described in order to best explain the principles and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method of generating a second pose of a model from an initial pose of the model, the method comprising:
   receiving the initial pose of the model, the model comprising an underlying object and a surface object;
   displaying the model in the initial pose;
   receiving input specifying a deformation of the model from the initial pose to the second pose of the model;
   measuring a distortion of the surface object in the second pose relative to the initial pose;
   generating, by a computer system, an inversely distorted surface object in the initial pose of the model using the measured distortion; and
   generating a corrected surface object in the second pose by applying the deformation of the model to the inversely distorted surface object, and
   displaying the model in the second pose.

2. The method of claim 1, wherein measuring the distortion of the surface object in the second pose comprises calculating an edge distortion ratio for each edge in the surface object.

3. The method of claim 2, further comprising:
   receiving a distortion correction factor, wherein the distortion correction factor is used to generate the inversely distorted surface object.

4. The method of claim 3, further comprising:
   determining a scaling factor using the distortion correction factor and the edge distortion ratio, wherein the inversely distorted surface object is generated by scaling the edges the surface object using the scaling factor.

5. The method of claim 4, wherein the scaling factor is directly proportional to the correction factor and inversely proportional to the edge distortion ratio.

6. The method of claim 4, wherein the scaling factor is calculated as the sum of 1 and a product of the distortion correction factor with a quantity, the quantity determined by subtracting 1 from the reciprocal of the edge distortion ratio.

7. The computer product of claim 4, wherein the scaling factor is calculated as the sum of 1 and a product of the distortion correction factor with a quantity, wherein the quantity is determined by subtracting 1 from the reciprocal of the edge distortion ratio.

8. The method of claim 3, wherein the distortion correction factor is defined by a user.

9. The method of claim 1, wherein the surface object comprises a fine mesh, wherein measuring the distortion comprises:
   determining a coarse mesh associated with the surface object;
   deforming the coarse mesh to the second pose of the model; and
   measuring an edge distortion ratio for a plurality of edges in the coarse mesh.

10. The method of claim 9, wherein generating the inversely distorted surface objects comprises:
    scaling the edges in the coarse mesh to generate an inversely distorted coarse mesh; and
    applying the inversely distorted coarse mesh to generate an inversely distorted fine mesh.

11. The method of claim 10, wherein positions of vertices in the fine mesh are calculated using a weighted average of the positions of the closest vertices in the coarse mesh.

12. A computer product comprising a non-transitory computer readable medium storing a plurality of instructions that when executed control a computer system to perform deformation of a model from an initial pose of the model to a second pose of the model, the instructions comprising:
    receiving the initial pose of the model, the model comprising an underlying object and a surface object;
    displaying the model in the initial pose;
    receiving input specifying a deformation of the model from the initial pose to the second pose of the model;
    measuring a distortion of the surface object in the second pose relative to the initial pose;
    generating an inversely distorted surface object in the initial pose of the model using the measured distortion; and
    generating a corrected surface object in the second pose by applying the deformation of the model to the inversely distorted surface object, and
    displaying the model in the second pose.

13. The computer product of claim 12, wherein measuring the distortion of the surface object in the second pose comprises calculating an edge distortion ratio for each edge in the surface object.

14. The computer product of claim 13, wherein the instructions further comprise: receiving a distortion correction factor, wherein the distortion correction factor is used to generate the inversely distorted surface object.

15. The computer product of claim 14, wherein the instructions further comprise: determining a scaling factor using the distortion correction factor and the edge distortion ratio, wherein the inversely distorted surface object is generated by scaling the edges the surface object using the scaling factor.

16. The computer product of claim 15, wherein the scaling factor is directly proportional to the correction factor and inversely proportional to the edge distortion ratio.

17. The computer product of claim 14, wherein the distortion correction factor is defined by a user.

18. The computer product of claim 12, wherein the surface object comprises a fine mesh, wherein measuring the distortion comprises:
    determining a coarse mesh associated with the surface object;
    deforming the coarse mesh to the second pose of the model; and
    measuring an edge distortion ratio for a plurality of edges in the coarse mesh.

19. The computer product of claim 18, wherein generating the inversely distorted surface objects comprises:

scaling the edges in the coarse mesh to generate an inversely distorted coarse mesh; and applying the inversely distorted coarse mesh to generate an inversely distorted fine mesh.

20. The computer product of claim 19, wherein applying the inversely distorted coarse mesh comprises calculating positions of vertices in the fine mesh using a weighted average of one or more positions of the closest vertices in the coarse mesh.

* * * * *